(12) United States Patent
Saito et al.

(10) Patent No.: US 7,934,419 B2
(45) Date of Patent: May 3, 2011

(54) INTAKE AIR MASS FLOW MEASUREMENT DEVICE

(75) Inventors: Takayuki Saito, Hitachinaka (JP); Shinya Igarashi, Naka (JP); Takayuki Yogo, Hitachinaka (JP); Chihiro Kobayashi, Naka (JP)

(73) Assignee: Hitachi, Ltd., Tokyo (JP)

(*) Notice: Subject to any disclaimer, the term of this patent is extended or adjusted under 35 U.S.C. 154(b) by 333 days.

(21) Appl. No.: 12/132,888

(22) Filed: Jun. 4, 2008

(65) Prior Publication Data
US 2008/0302173 A1  Dec. 11, 2008

(30) Foreign Application Priority Data
Jun. 6, 2007 (JP) ................... 2007-149872

(51) Int. Cl.
*G01M 15/04* (2006.01)
(52) U.S. Cl. .................................. 73/114.37
(58) Field of Classification Search ............... 73/114.31, 73/114.32, 114.33, 114.37
See application file for complete search history.

(56) References Cited

U.S. PATENT DOCUMENTS

| | | | |
|---|---|---|---|
| 4,264,961 A | 4/1981 | Nishimura et al. | |
| 6,505,505 B1 | 1/2003 | Henzinger et al. | |
| 6,581,447 B1 | 6/2003 | Strohrmann et al. | |
| 6,681,742 B1* | 1/2004 | Hirayama et al. | 123/399 |
| 6,708,560 B2* | 3/2004 | Watanabe et al. | 73/204.22 |
| 6,854,326 B2* | 2/2005 | Watanabe et al. | 73/204.22 |
| 7,383,815 B2* | 6/2008 | Hirayama et al. | 123/399 |
| 7,415,346 B2* | 8/2008 | Musashi et al. | 701/103 |
| 2003/0126925 A1* | 7/2003 | Roeckel et al. | 73/204.22 |
| 2004/0055375 A1* | 3/2004 | Zurek et al. | 73/204.12 |
| 2006/0112763 A1 | 6/2006 | Uramachi et al. | |
| 2006/0231073 A1* | 10/2006 | Musashi et al. | 123/399 |

FOREIGN PATENT DOCUMENTS

| | | |
|---|---|---|
| DE | 197 50 496 A1 | 5/1999 |
| EP | 1 128 168 A2 | 8/2001 |
| EP | 1 363 110 A1 | 11/2003 |
| JP | 8-297040 | 11/1996 |
| JP | 11-64059 | 3/1999 |
| JP | 3523022 | 2/2004 |
| JP | 2006-292391 | 10/2006 |

* cited by examiner

*Primary Examiner* — Eric S McCall
(74) *Attorney, Agent, or Firm* — Brundidge & Stanger, P.C.

(57) ABSTRACT

In an intake air mass flow measurement device, for preventing clogging in a pressure intake tube due to water or the like entering the pressure intake tube in a device measuring a pressure in the intake air tube, the intake air mass flow measurement device includes a mass air flow measurement device for measuring an intake air mass flow in an intake air tube; and a pressure sensing device for sensing pressure in the intake air tube, the pressure sensing device being integrated with the mass air flow measurement device, and an aperture plane opened to the inside of a main air flow passage for detection of the pressure takes in pressure by using a gap generated between a main air flow passage constituting member and an insertion part of the mass air flow measurement device when a measurement part of the mass air flow measurement device is inserted into the main air flow passage. With this construction, it is possible to provide a structure in which water or the like can hardly clog the pressure intake port.

9 Claims, 5 Drawing Sheets

INTAKE AIR MASS FLOW MEASUREMENT DEVICE

FIELD OF THE INVENTION

The present invention relates to a heating resistor type mass air flow measurement device which is suitable for measurement of intake air mass flow in an internal combustion engine and to an internal combustion control device using the same.

DESCRIPTION OF RELATED ART

As a mass flow measurement technology for an internal combustion engine, a heating resistor type mass air flow measurement device is known (see JP-B2-3523022 for reference). This device takes advantage of the fact that the amount of heat that a heating resistor is deprived of is in correlation with the amount of intake air flow and is capable of directly measuring the mass air flow needed by the combustion control of an engine, and is therefore widely used, particularly, as a flow meter for air fuel ratio control in an automobile.

Moreover, as a pressure sensing device for detecting pressure in an intake air tube, a type of the device disclosed in JP-A-2006-292391 is generally used that has a pressure sensing part formed of a semiconductor, and uses a pressure intake tube.

Furthermore, as a known technology, which is believed to be the closest to the present invention, an example is disclosed in JP-A-11-064059 that a heating resistor type mass air flow measurement device is integrated with a pressure sensing device using a pressure intake tube.

In recent years, automobiles using an electronic fuel injection system have become in general use, and in such a case, various sensors and controllers are arranged close to each other inside an engine room.

In addition, in such a case, a wiring harness for connecting the various sensors, controllers, a control unit for control thereof and so on is entangled into a complex form.

For this reason, it is desirable to decrease the number of components by integrating a plurality of sensors and controller with each other. As an example, there has been taken measures in which the heating resistor type mass air flow measurement device is integrated with the semiconductor type pressure converter so that connectors can be used in common. With such measures, the number of process steps for assembling components into an automobile can be decreased and the wirings can be simplified.

In addition, the pressure intake tube of the pressure sensing device is generally constructed by a narrow tube. This is to prevent pressure sensing errors which may be caused when dust or water enters the pressure sensing part. Since the pressure sensing part is formed by a semiconductor silicon diaphragm, it has a very small structure. For this reason, the pressure intake tube is required to have a structure in which dust or water hardly enters the tube.

On the other hand, when the pressure intake tube is formed into a narrow tube, if water enters the tube, the water can easily form a water film or be frozen, which may serve as one cause of degradation in pressure sensing precision.

An air cleaner is provided on the upstream side of an intake air tube of an internal combustion engine, and therefore, air free of dust or the like in the atmosphere is conveyed to the engine. However, since the dust collecting capability of the air cleaner is not perfect, fine dust components may pass through the air cleaner and enter the engine through the intake air tube. Furthermore, since the pressure intake tube of the pressure sensing device is provided in a state where the pressure intake tube is exposed to the intake air in the intake air tube, such invasion of dust or the like may occur.

In addition, although water is captured by the air cleaner, it may soak through a filter due to its moisture, and when the amount of moisture soaking through the filter exceeds the allowable capacity of the filter, the water may be discharged to the intake air tube. There is also a possibility that the discharged water reaches the pressure intake tube.

BRIEF SUMMARY OF THE INVENTION

An object of the present invention is to provide a structure of an intake air mass flow measurement device which is suitable for being integrated with an intake air pressure measurement device.

In order to cope with the problems described above, attention is paid to a gap (clearance) between an intake air tube passage constituting member and a mass air flow measurement device, the gap being formed at an insertion hole (opening) provided in the intake air tube for inserting the mass air flow measurement device in the intake air tube. For example, in a heating resistor type mass air flow measurement device, since the device having a structure that an air temperature compensation resistor and a bypass passage are integrated therein in addition to an air flow sensing element is inserted in the intake air tube, the intake air tube has a very large structure compared with the pressure intake tube.

A gap is inevitably formed around the insertion part of the mass air flow measurement device, and although the size of the gap itself is small, considering as the gap around the entire circumference of the insertion part of the mass air flow measurement device, it is possible to obtain a relatively large opening size. The possibility of occurrence of a water film in the gap is basically the same as the conventional pressure intake tube; however, the possibility that the water film extends over the entire circumference is extremely low. In this case, the gap is not necessarily particularly the entire circumference but may have a structure in which the mass air flow measurement device is partially contacted with the intake air tube as long as the gap enables measurement of the pressure and prevents the water film from extending over the entire circumference.

In order to take in the pressure through the gap between the mass air flow measurement device and an intake air tube constituting member which constitutes an intake air tube passage, it is preferable that an opening position of a pressure intake port formed in an intake air mass flow measurement device body is located at a gap part which is located at an outer side than an inner wall of the intake air tube passage constituted by the intake air tube passage constituting member, as viewed from the diameter direction of the intake air tube. Here, the inner wall of the intake air tube passage is not present in an insertion hole (opening) part. Therefore, in the insertion hole (opening) part, the opening position can be defined at an outer position than the inner wall of the intake air tube passage based on an extension line which is extended from the inner walls of the intake air tube passage at both sides in the circumferential direction along the shape thereof.

Moreover, the pressure intake port formed in a mass air flow meter body is preferably constructed such that an intake passage thereof formed by a tube passage is preliminarily opened to a recess provided in an outer wall of the intake air mass flow measurement device body. This is to prevent dust or the like from easily adhering onto the outer wall of the mass air flow meter body and to thus prevent the adhering dust from disturbing the pressure intake process.

Furthermore, the above recess is preferably disposed on the intake air mass flow measurement device body so as to be located on the downstream side of the intake air flow. This is because when air flow collides with the mass air flow meter body, it is difficult to precisely perform the pressure intake process due to the influence of dynamic pressure or turbulent flow.

Furthermore, the pressure sensing part is preferably installed at an attachment flange part which is used for attaching and fixing a mass air flow meter to the intake air tube by using a screw or the like. This is because when the pressure sensing part is formed as a submodule, the attachment properties of the pressure sensing part can be improved, and moreover, it may lead to decrease in the overall cost of the device. If the pressure sensing part is not formed as a submodule, it is necessary to install the pressure sensing part and the pressure intake port in the passage. For this reason, when adjusting the relationship between pressure and output in an electrical manner, this adjustment operation has to be performed in the intake air tube, which is difficult to work, and as a result, the production cost increases.

Today, the world faces environmental problems such as global warming. In this regard, the present invention can contribute to saving natural resources by decreasing the number of components of the combustion control device. Moreover, to cope with exhaust gas control, it is necessary to be able to maintain high-precision fuel control for a long period of time. By doing this, it becomes possible to decrease the amount of characteristics change with age in the heating resistor type mass air flow measurement device and the pressure sensing device. With this construction, it is possible to provide an engine control system that is eco-friendly and fuel-efficient and discharges cleaner exhaust gas.

Other objects, features and advantages of the invention will become apparent from the following description of the embodiments of the invention taken in conjunction with the accompanying drawings.

DETAILED DESCRIPTION OF THE INVENTION

Figure 7:
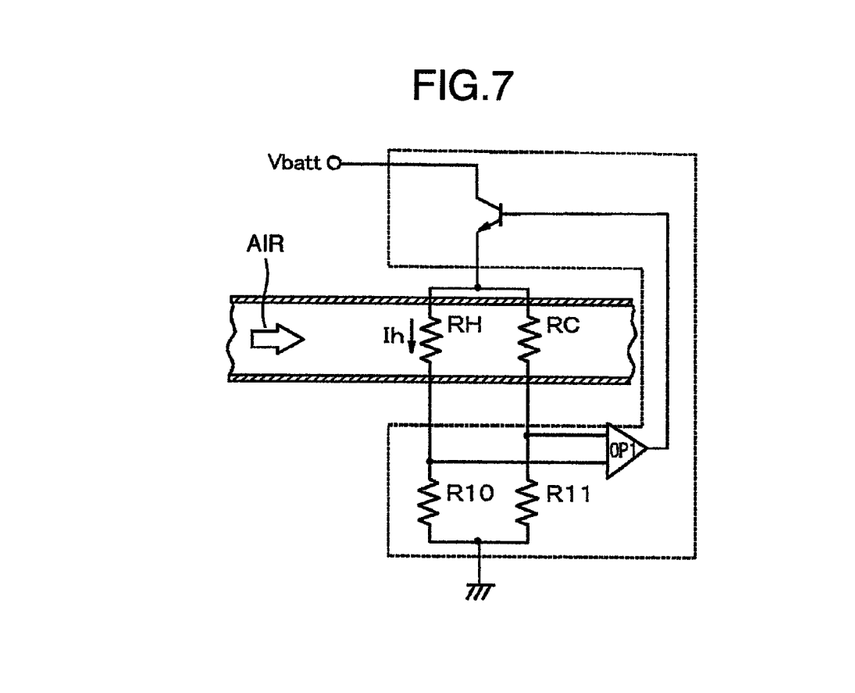
FIG. 7 is a view illustrating a simplified circuit construction of the heating resistor type mass air flow measurement device.

First, the operation principle of a heating resistor type mass air flow measurement device that uses a heating resistor will be described as an example of an intake air flow measurement device. FIG. 7 shows a schematic circuit diagram of the heating resistor type mass air flow measurement device. A drive circuit of the heating resistor type mass air flow measurement device is mainly composed of a bridge circuit and a feedback circuit. The bridge circuit is composed of a heating resistor RH for measuring intake air mass flow and air temperature compensation resistors RC, R10, and R11 for compensating intake air flow temperature. A feedback path is formed by using an operational amplifier OP1, and a heating current Ih is flown to the heating resistor RH to thereby output an output signal V2 corresponding to the mass air flow so that constant temperature difference is maintained between the heating resistor RH and the air temperature compensation resistor RC. Specifically, when the speed of the air flow is high, the amount of heat deprived from the heating resistor RH is large, and therefore, a large amount of heating current Ih is flown. On the other hand, when the speed of the air flow is low, the amount of heat deprived from the heating resistor RH is small, and therefore, a small amount of heating current Ih is required.

Figure 5:
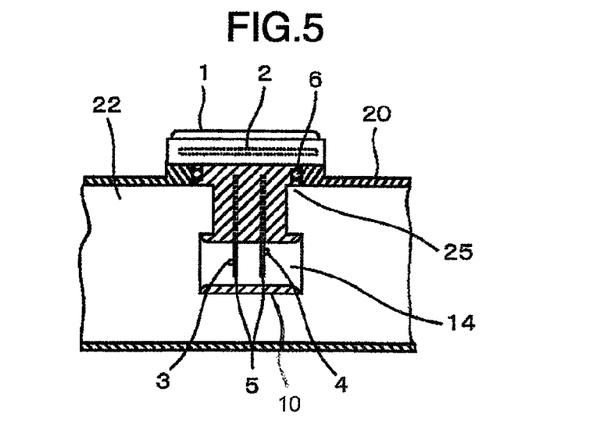
FIG. 5 is a cross sectional view illustrating a simplified structure of a typical heating resistor type mass air flow measurement device.
Figure 6:
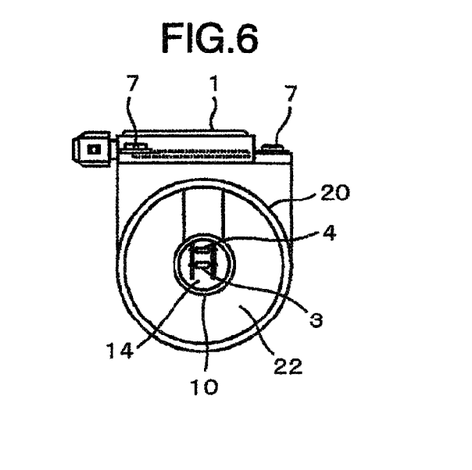
FIG. 6 is a view illustrating the device of FIG. 5 as viewed from the upstream side of an intake air flow.

FIG. 5 is a cross sectional view illustrating an example of a heating resistor type mass air flow measurement device, and FIG. 6 is an external view taken from the upstream side (left side) thereof.

The heating resistor type mass air flow measurement device includes a housing constituting member 1 that houses a circuit substrate 2, which forms a drive circuit, and a bypass passage constituting member 10, which is formed of a non-conductive member. In the bypass passage constituting member 10, a heating resistor 3 for detecting mass air flow and an air temperature compensation resistor 4 for compensating intake air flow temperature are disposed so as to be electrically connected to the circuit substrate 2 via a support body 5 formed of a conductive member. The housing, the circuit substrate 2, the bypass passage 14, the heating resistor 3, the air temperature compensation resistor 4 and so on are incorporated into a single module to constitute the heating resistor type mass air flow measurement device. A hole (opening) 25 is opened in the wall of a main air flow passage constituting member 20, which constitutes an intake air tube 22. The bypass passage part of the heating resistor type mass air flow measurement device is inserted from the outside into the hole 25, and the wall of the bypass passage constituting member and the housing constituting member 1 are fixed to each other by a screw 7 or the like so that mechanical strength can be maintained. In addition, a seal material 6 is attached between the bypass passage constituting member 10 and the main air flow passage constituting member so that air-tight sealing between the inside and the outside of the intake air tube is maintained.

Next, an example of a general pressure sensing device will be described with reference to FIGS. 9 and 10.

Figure 9:
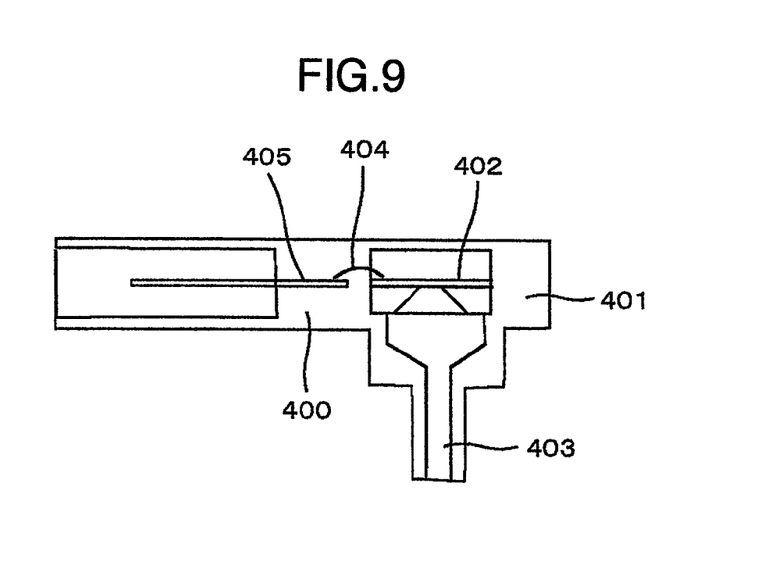
FIG. 9 is a view illustrating the structure of the pressure measurement device.
Figure 10:
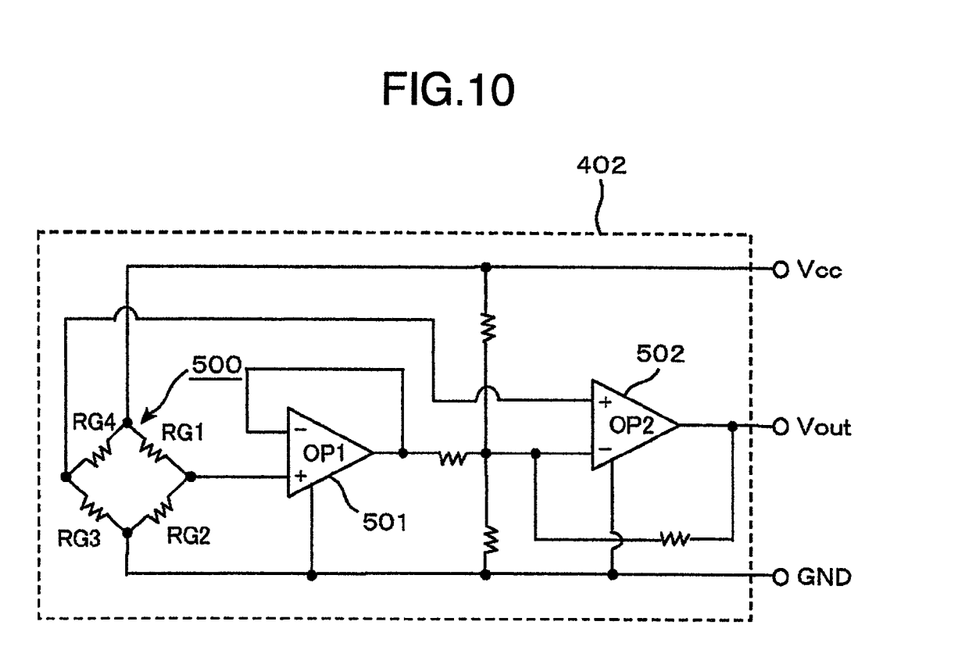
FIG. 10 is a view illustrating a circuit diagram of the pressure measurement device.

FIG. 9 shows a schematic sectional structure of the pressure sensing device. The pressure sensing device 400 is composed of a housing constituting member 401 which forms an outer case, a pressure intake tube 403, a pressure sensing part 402, a connector terminal 405 which serves as an interface to the outside, and a bonding member 404 for electrically connecting the pressure sensing part 402 to the connector terminal 405. In the drawings, the screws and sealing material for attachment and fixation, the intake air tube or the like are not illustrated. The pressure sensing part 402 generally has a circuit construction as shown in FIG. 10 and is operable to detect pressure by a bridge circuit of a gauge part 500, which is formed by a semiconductor technology, to thereby output a pressure signal via amplifier circuits 501 and 502.

Embodiment 1

A specific construction example of the present invention will be described with reference to FIG. 1.

An insertion port 155 (see FIG. 2) into which a part of the heating resistor type mass air flow measurement device 100 is inserted is formed in a part of a main air flow passage constituting member (intake air tube constituting member) 200, which forms a main air flow passage (hereinafter, referred to as intake air tube passage, or simply, intake air tube) 201, in which the heating resistor type mass air flow measurement device 100 including the pressure sensing part 150 integrally is provided. The attachment is performed by fixing the housing constituting member 101 which forms a case member of the heating resistor type mass air flow measurement device 100, to the intake air tube passage constituting member 200 by a screw 104.

The heating resistor type mass air flow measurement device 100 includes, in addition to the housing constituting member 101, a base member 107 formed of a metallic material, a cover constituting member 109 for protecting the circuit substrate 106, a heating resistor 112 for measuring mass air flow, a bypass passage constituting member 110 for constructing a bypass passage 202 for installing therein the heating resistor 112, and a seal member 105 for hermetically sealing the main air flow passage 201 from the outside. Electrical signals from the heating resistor 112 are connected to the connector terminal 103 via a terminal member 111, a bonding member 108, a circuit substrate 106 and a bonding member 108, and are electrically connected to an ECU (not shown) or the like.

Figure 1:
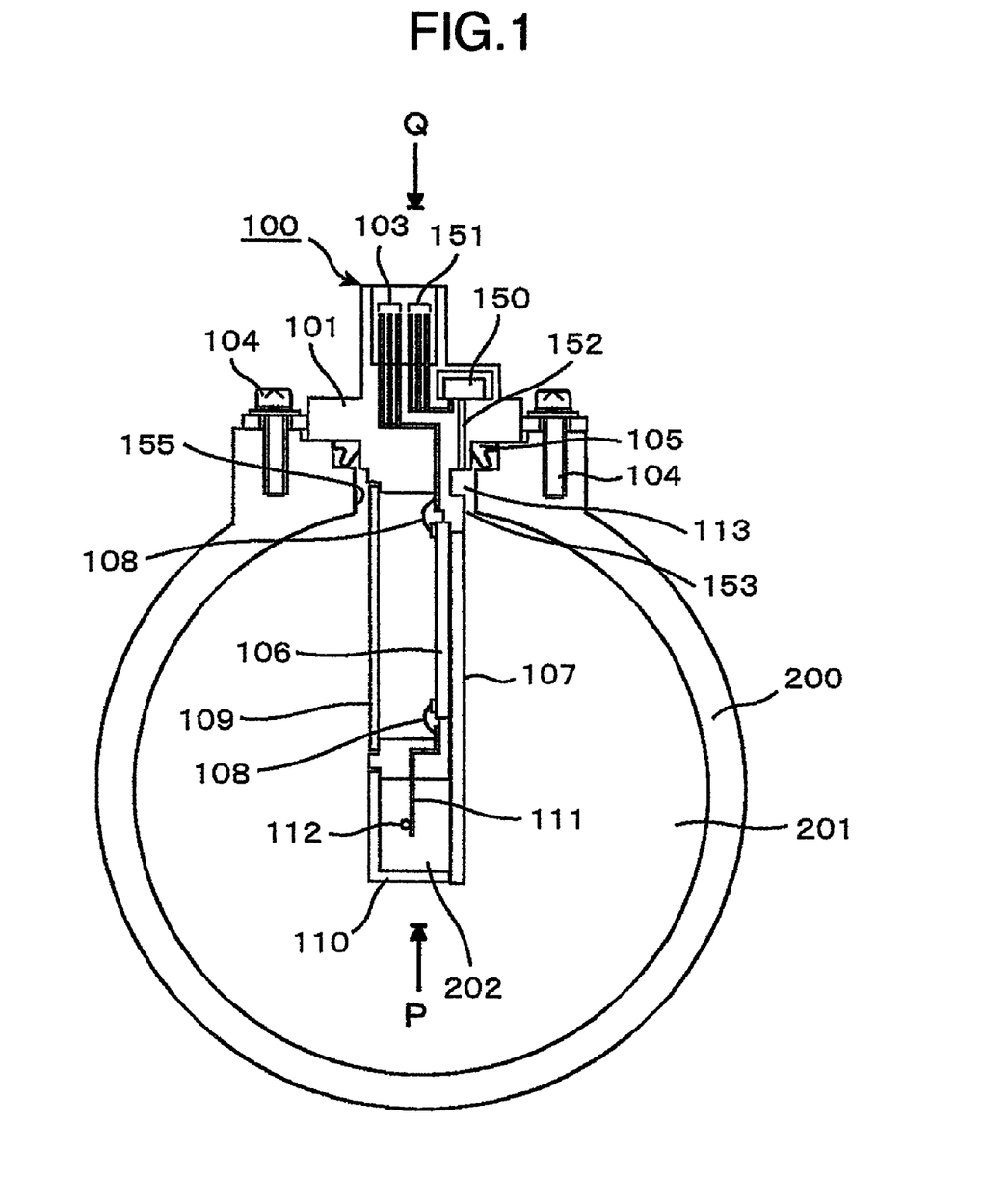
FIG. 1 is a view illustrating a structure of a mass air flow measurement device according to an embodiment of the present invention.
Figure 3:
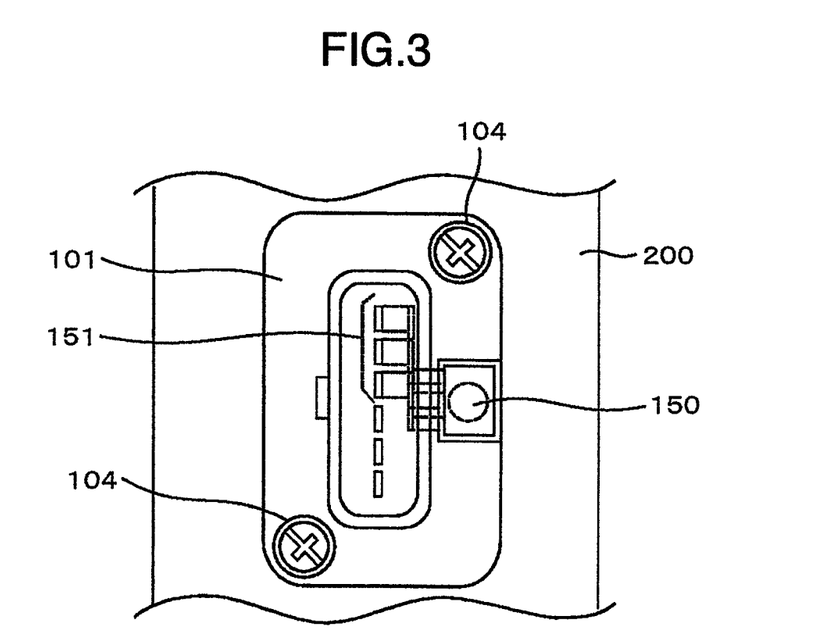
FIG. 3 is a view illustrating the position of a pressure measurement device when the mass air flow measurement device of FIG. 1 is viewed from the Q direction.

FIG. 3 is a view as viewed from the upper side (Q) of FIG. 1. The pressure sensing part 150 is installed in a part of the housing constituting member 101 of the heating resistor type mass air flow measurement device 100, and the pressure signal is output to the outside via the connector terminal 151.

Referring to FIG. 1, for pressure detection of the pressure sensing part 150, the pressure intake tube (pressure intake port) 152 is installed in a part of the housing constituting member 101, and one end of the pressure intake tube 152 is opened to a concave part 113 which is disposed closer to the main air flow passage 201 than the seal material 105 and is disposed outside the inner diameter of the main air flow passage constituting member 200.

Figure 2:
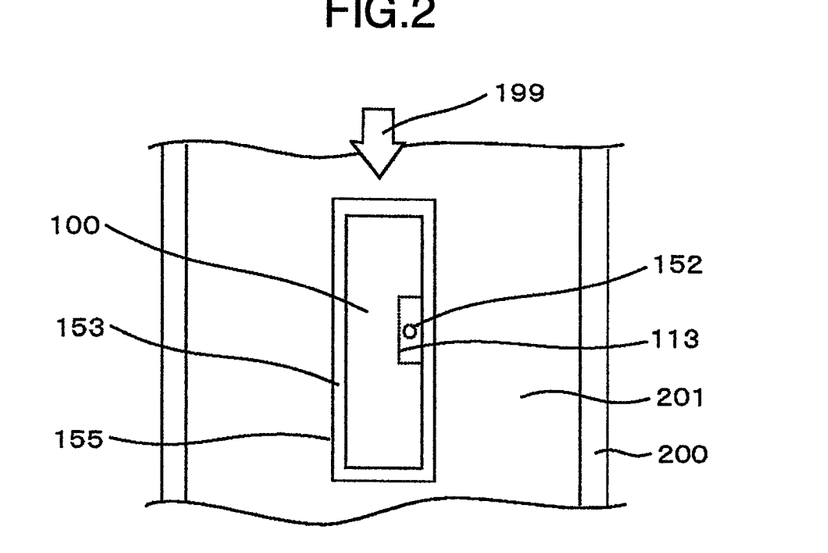
FIG. 2 is a view illustrating the position of a pressure intake port when the mass air flow measurement device of FIG. 1 is viewed from the P direction.

FIG. 2 is a view when FIG. 1 is viewed from the P direction. A gap 153 is formed between the insertion port 155 installed in a direction perpendicular to the direction of the main air flow passage stream 199 flowing in the main air flow passage constituting member 200 and a main air flow passage insertion part of the heating resistor type mass air flow measurement device 100. In general, the gap 153 has a structure in which it is formed around the entire circumference of the heating resistor type mass air flow measurement device 100. Although the size of the gap formed around the circumference of the insertion part of the heating resistor type mass air flow measurement device 100 is small, since the insertion part itself has a considerable size as a structure, it is possible to obtain a relatively large opening size as the gap around the entire circumference of the insertion part. The possibility of occurrence of a water film in the gap is basically the same as the conventional pressure intake tube; however, the possibility that the water film extends over the entire circumference is extremely low. In addition, the gap 153 is not necessarily particularly the entire circumference but may have a structure that two members are partial contacted.

In addition, the gap 153 is preferably sized to provide such a clearance that the main air flow passage insertion part of the heating resistor type mass air flow measurement device 100 is inserted into the main air flow passage; however, the invention is not limited to this but may have a gap of a size greater than the clearance. However, the larger the insertion port 155 relative to the main air flow passage insertion part of the heating resistor type mass air flow measurement device 100, the larger the outer size of the heating resistor type mass air flow measurement device 100 is, because the seal material has to be disposed at the outer side. For this reason, it is more advantageous to use the gap having such a size as the conventional clearance than uselessly increasing the outer size of the heating resistor type mass air flow measurement device 100.

Figure 4:
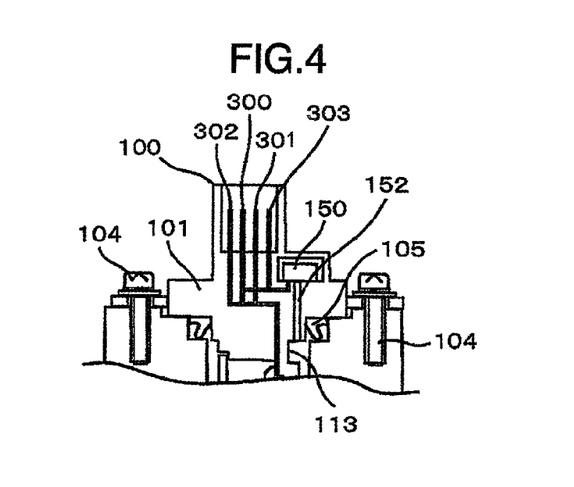
FIG. 4 is a view illustrating a structure of a mass air flow measurement device according to another embodiment of the present invention.

FIG. 4 shows an example in which the terminal construction of the connector part in FIG. 1 is modified. In FIG. 1, the connector terminal 103 of the heating resistor type mass air flow measurement device 100 is constructed in an independent manner from the connector terminal 151 of the pressure sensing part 150. The heating resistor 112 is generally formed of a wire or the like made of platinum and requires a battery voltage (about 12 volts) when it is used in an internal combustion engine. To the contrary, the pressure sensing device is a very small sensing element formed by a semiconductor technology, and therefore, it is driven by a reference voltage (about 5 bolts) of an ECU. However, when the heating resistor 112 is formed by a semiconductor technology similar to the pressure sensing part 150, it does not require any battery voltage and can be driven by the reference voltage of the ECU. Therefore, a power supply voltage terminal 300 and a ground terminal 301, adjacent an air flow signal terminal 302 and a pressure signal terminal 303, respectively, can be used in common by the heating resistor type mass air flow measurement device 100 and the pressure sensing part 150, with the result that it leads to reduction in the number of components. Moreover, the size of the connector part in which the connector terminal is installed can be decreased.

The embodiment described above has the following features.

The intake air mass flow measurement device includes an mass air flow measurement part for measuring intake air mass flow in an intake air tube and the pressure sensing part 150 for sensing pressure in the intake air tube 201, and the pressure in the intake air tube 201 is taken to the pressure sensing port 150 via a gap generated between the intake air tube passage constituting member 200 and the mass air flow measurement part when the mass air flow measurement part is inserted into the intake air tube 201.

The intake air mass flow measurement device includes an mass air flow measurement part for measuring intake air mass flow in an intake air tube and the pressure sensing part 150 for sensing pressure in the intake air tube 201, and the pressure intake port 152 for taking the pressure in the intake air tube 201 into the pressure sensing part 150 is opened to the gap 153 generated between the intake air tube passage constituting member 200 and the mass air flow measurement part when the mass air flow measurement part is inserted into the intake air tube 201. In this case, the concave part 113 (which is indented in a direction away from the gap 153) may be formed in the opening of the pressure intake port to the gap 153 such that the gap 153 is increased.

The gap 153 is formed between an outer surface of the intake air mass flow measurement device facing in a direction perpendicular to the insertion direction in which the mass air flow measurement part is inserted into the intake air tube 201 and a surface (cutout surface) formed in the thickness direction of the intake air tube constituting member 200, the surface being formed in the opening 155 formed in the intake air tube constituting member 200 in order to insert the mass air flow measurement part into the intake air tube 201.

Figure 8:
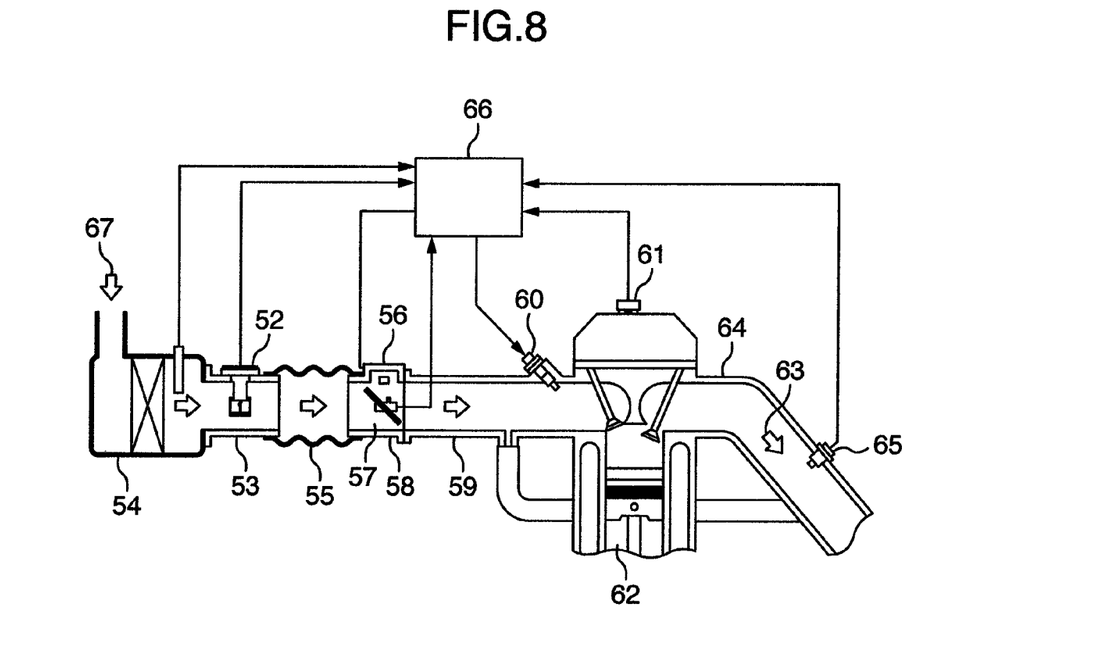
FIG. 8 is a view illustrating a simplified system construction of an internal combustion engine using the heating resistor type mass air flow measurement device.

Finally, an embodiment in which the present invention is applied to an electronic fuel injection type internal combustion engine will be described with reference to FIG. 8. An intake air flow 67 taken from an air cleaner 54 is taken into an engine cylinder 62 via a body 53 in which the heating resistor type mass air flow measurement device 100 is inserted, an intake duct 55, a throttle body 58, and an intake manifold 59 equipped with an injector 60 from which fuel is supplied. Meanwhile, gas 63 generated in the engine cylinder 62 is discharged out via a discharge manifold 64.

A control unit 66 is supplied with a mass airflow signal and a pressure signal output from a circuit module 52 of the heating resistor type mass air flow measurement device 100, an intake air flow temperature signal from a temperature sensor, a throttle valve angle signal output from a throttle angle sensor 57, an oxygen concentration signal output from an oxygen meter 65 installed in the discharge manifold 64, an engine rotation speed signal output from an engine rotation speed meter 61, and the like. Upon receipt of these signals, the control unit 66 sequentially carries out a predetermined calculation on the signals to determine an optimal amount of fuel injection and an idle air control valve opening and controls the injector 60 and an idle control valve 56 based on the determined amount and opening.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An intake air mass flow measurement device, comprising:
    a mass air flow measurement device for measuring an intake air mass flow in an intake air tube; and
    a pressure sensing device for sensing pressure in the intake air tube, the pressure sensing device being integrated with the mass air flow measurement device,
    wherein an aperture plane opened to the inside of the intake air tube for detection of the pressure takes in pressure by using a gap generated between an intake air tube constituting member and a measurement part of said mass air flow measurement device,
    wherein an opening position of a pressure intake port formed in an intake air mass flow measurement device body is positioned at an outer side of an inner wall of an intake air tube passage formed by an intake air tube passage constituting member, as viewed from a diametric direction of the intake air tube, and
    wherein the pressure intake port formed in the intake air mass flow measurement device body is constructed such that an intake passage thereof formed by a tube passage is preliminarily opened to a recess formed in an outer wall of the intake air mass flow measurement device body, and that pressure is taken in via the recess.

2. The intake air mass flow measurement device according to claim 1, wherein the recess is disposed on the intake air mass flow measurement device body so as to be located on a downstream side of the intake air flow.

3. A fuel injection system of an internal combustion engine, which uses the intake air mass flow measurement device according to claim 1.

4. An intake air mass flow measurement device, comprising:
    a mass air flow measurement device for measuring an intake air mass flow in an intake air tube; and
    a pressure sensing device for sensing pressure in the intake air tube, the pressure sensing device being integrated with the mass air flow measurement device,
    wherein said pressure sensing device includes a sensing part for detecting pressure and an intake port for taking in pressure,
    wherein the pressure sensing part is installed at an attachment flange part for attaching and fixing a mass air flow meter to the intake air tube by using a screw, and
    wherein an aperture plane of the pressure intake port opened to the inside of the intake air tube takes in pressure by using a gap generated in an intake air tube constituting member.

5. A fuel injection system of an internal combustion engine, which uses the intake air mass flow measurement device according to claim 4.

6. An intake air mass flow measurement device, comprising:
    a mass air flow measurement part for measuring an intake air mass flow in an intake air tube; and
    a pressure sensing part for sensing pressure in the intake air tube,
    wherein a pressure intake port for taking pressure in the intake air tube into the pressure sensing part is opened to a gap generated between an intake air tube constituting member and the mass air flow measurement part, and
    wherein a recess is formed in an opening which is opened to said gap of said pressure intake port such that said gap is increased.

7. The intake air mass flow measurement device according to claim 6, wherein said gap is formed between an outer surface of the intake air mass flow measurement device facing in a direction perpendicular to the insertion direction in which the mass air flow measurement part is inserted into the intake air tube and a surface formed in the thickness direction of the intake air tube constituting member, the surface being formed in the opening formed in the intake air tube constituting member in order to insert the mass air flow measurement part into the intake air tube.

8. An intake air mass flow measurement device, comprising:
    a mass air flow measurement part for measuring an intake air mass flow in an intake air tube; and
    a pressure sensing part for sensing pressure in the intake air tube,
    wherein the pressure in the intake air tube is taken in the pressure sensing part via a gap generated between an intake air tube constituting member and the mass air flow measurement part, and
    wherein said gap is formed between an outer surface of the intake air mass flow measurement device facing in a direction perpendicular to the insertion direction in which the mass air flow measurement part is inserted into the intake air tube and a surface formed in the thickness direction of the intake air tube constituting member, the surface being formed in the opening formed in the intake air tube constituting member in order to insert the mass air flow measurement part into the intake air tube.

9. An intake air mass flow measurement device, comprising:
a mass air flow measurement part for measuring an intake air mass flow in an intake air tube; and
a pressure sensing part for sensing pressure in the intake air tube,
wherein a pressure intake port for taking pressure in the intake air tube into the pressure sensing part is opened to a gap generated between an intake air tube constituting member and the mass air flow measurement part, and
wherein said gap is formed between an outer surface of the intake air mass flow measurement device facing in a direction perpendicular to the insertion direction in which the mass air flow measurement part is inserted into the intake air tube and a surface formed in the thickness direction of the intake air tube constituting member, the surface being formed in the opening formed in the intake air tube constituting member in order to insert the mass air flow measurement part into the intake air tube.

* * * * *